United States Patent
Kitai

[15] 3,657,986
[45] Apr. 25, 1972

[54] ELECTRIC POWER SOURCE SWITCHING DEVICE OF ELECTRIC SHUTTER

[72] Inventor: Kiyoshi Kitai, Tokyo, Japan
[73] Assignee: Kabushiki Kaisha Hattori Tokeiten, Tokyo, Japan
[22] Filed: July 28, 1969
[21] Appl. No.: 845,388

[30] Foreign Application Priority Data

July 29, 1968 Japan..............................43/53083

[52] U.S. Cl. ...................................................95/53 EB
[51] Int. Cl. ..................................................G03b 9/62
[58] Field of Search.............................95/53, 53 E, 10 C

[56] References Cited

UNITED STATES PATENTS

| | | |
|---|---|---|
| 3,398,668 | 8/1968 | Starp ........................................95/53 |
| 3,452,662 | 7/1969 | Singer.......................................95/53 |
| 3,507,201 | 4/1970 | Fahlenberg et al. ......................95/53 |
| 3,353,462 | 11/1967 | Suzuki..................................95/10 C |

Primary Examiner—Samuel S. Matthews
Assistant Examiner—Russell E. Adams, Jr.
Attorney—Robert E. Burns and Emmanuel J. Lobato

[57] ABSTRACT

A camera is equipped with a switching mechanism which connects an electric delay circuit with an electric power source prior to the actuation of a shutter actuating mechanism. The switching mechanism is manually actuated by a trigger lever which is then operatively disconnected from the switching mechanism and the switching mechanism is returned to its initial position in response to closing of the shutter by means of the shutter actuating mechanism.

5 Claims, 4 Drawing Figures

PATENTED APR 25 1972 3,657,986

ELECTRIC POWER SOURCE SWITCHING DEVICE OF ELECTRIC SHUTTER

The present invention relates to a switching mechanism which coordinates the movement of a camera shutter with the energization of an electric delay circuit. A manually operable trigger lever is actuated to connect the electric delay circuit to an electric power source prior to the actuation of a shutter actuating mechanism and after the time period determined by the delay circuit has elapsed, the shutter is automatically moved to its closed position by the shutter actuating mechanism. The trigger lever is effective to initiate the actuation of the shutter actuating mechanism and is thereafter disconnected from the switching mechanism. The switching mechanism is mounted in an unbiased condition and is movable to one position in response to movement of the trigger lever to energize the delay circuit and is returned to an initial position to deenergize the delay circuit in response to movement of the shutter actuating mechanism at the end of the exposure. Cameras employing electric delay circuits for controlling the time exposure are known in the art as electric shutter cameras and are characterized in that throughout the period in which the shutter is open, it is necessary to maintain an electrical connection between the electric delay circuit and its associated electric power source.

One technique used in the art is to use the trigger lever to close and maintain closed a switch connecting the delay circuit to the power source until the exposure operation of the shutter is completed. Unfortunately, if the trigger lever is released before the completion of the exposure operation, the connection between the electric delay device and the electric power source is broken resulting in an improperly timed exposure.

In order to eliminate such a drawback, it has been proposed to temporarily lock the trigger lever in a position wherein the electric delay circuit and the electric power source are connected and then releasing the trigger lever in response to a closing action of the shutter. Such a solution requires accurate machining tolerances and it is difficult, using actual manufacturing processes, to make the timing of the locking coincident to the opening of the shutter and therefore it has been found necessary to adjust the locking to occur just prior to the opening of the shutter. It is obviously necessary to electrically connect the delay circuit to the power source prior to the opening of the shutter, but the earlier they are connected with respect to the shutter opening, the larger the consumption of power. Therefore, the temporary locking in place of the trigger lever is usually adjusted to occur 0.05 mm or below (in terms of the stroke of the trigger lever) before the actuation of the shutter. Such a fine adjustment is very costly and therefore, undesirable.

Alternatively, another solution to the above-mentioned problem is to provide a supplementary switch in parallel with a power source switch which connects the electric delay circuit to the electric power source in response to the movement of the trigger lever. The supplementary switch is positioned such that it is closed in response to the opening of the shutter and opened in response to the closing of the shutter. Unfortunately, the operative life of such switches is much shorter than the life of the associated mechanical components, and hence the overall reliability of the camera decreases as the number of switches employed increases. Moreover, the use of a supplementary switch requires additional wiring, timing, and space, all of which are disadvantageous.

It is therefore an object of the present invention to provide an improved switching mechanism for use in a camera.

It is another object of the present invention to provide a manually operable trigger lever which electrically connects an electrical delay circuit to an electric power source prior to the actuation of the shutter actuating mechanism and which is thereafter rendered ineffective to break the electrical connection.

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it when read in conjunction with the accompanying drawings.

DESCRIPTION OF THE PREFERRED EMBODIMENT

Figure 1:
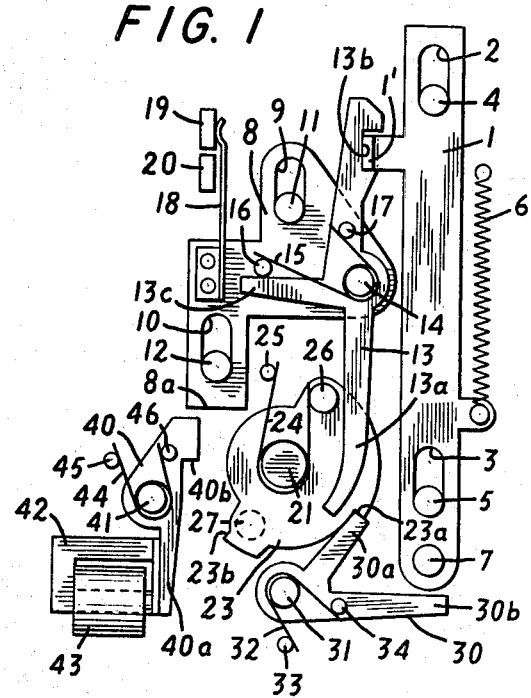
FIG. 1 is a diagrammatic illustration of the switching mechanism of the present invention showing the components in a ready condition with the shutter charged.
Figure 2:
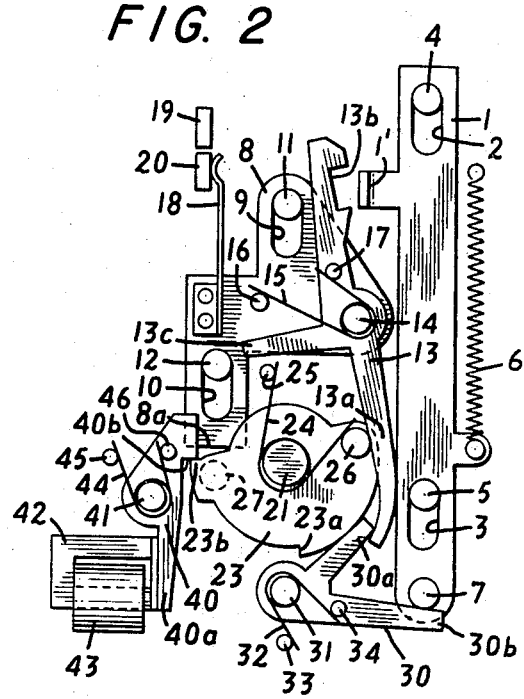
FIG. 2 is a diagrammatic illustration similar to FIG. 1 but showing the position of the components when the shutter is opened.

Referring now to the drawings, there is shown in FIG. 1 a manually operable trigger lever 1 having in each end thereof elongated guide slots 2 and 3. A pair of guide pins 4 and 5 are fitted within the guide slots 2 and 3 and cooperate to limit the vertical movement of the trigger lever 1. The trigger lever is normally biased in the upward direction by means of a coil spring 6, as shown in FIG. 1. On one end of the trigger lever 1 there is a projection 1' which lockingly engages and disengages with a mating portion of a release lever, and on the other end there is a pivot pin 7 which cooperates with a hooking lever, both of which are described below. A switch plate 8 having guide slots 9 and 10 therein is mounted for vertical displacement or movement guide pins 11 and 12, respectively and it should be noted that the switch plate is not biased into either its upper or lower position. Disconnecting means comprising release lever 13 is pivotally mounted on a pin 14 which is secured to the switch plate 8 and functions to release or disconnect the trigger lever from operative engagement with the remainder of the switching mechanism prior to the complete opening of the shutter. The release lever 13 comprises an actuating lever arm 13a, a locking lever arm 13b and a biasing lever arm 13c and in a ready or charged condition of the shutter, the release lever is normally biased into locking engagement with the projection 1' by means of a biasing spring 15. The biasing spring 15 is compressed between a pin 16 fixed to the switch plate 8 and a pin 17 secured to the locking arm 13b. An electrical contact arm 18 comprising a movable contact is also secured to the switch plate 8 and is operable to make an electrical connection between either stationary contact 19 or stationary contact 20 depending on whether the switch plate is in the upward position (as shown in FIG. 1) or the downward position (as shown in FIG. 2).

A shutter actuating mechanism comprises a drive cam 23 rotatably mounted in the camera housing and operable to open and close the shutter (not shown) in response to angular displacement thereof, as well known in the art. The drive cam 23 is profiled such that it includes a locking portion 23a and a return lobe 23b which function, respectively, to lock the shutter in its closed position and to return the switch plate 8 back to its ready position. The drive cam 23 is normally biased in a clockwise position, as viewed in FIGS. 1–3, by means of a spring 24 which is positioned around a pin 21 and compressed between a fixed pin 25 and a pin 26 which is secured to the cam surface. A return pin 27 is connected to the underside of the drive cam 23 and is operable to return the switch plate 8 back to its initial, ready position in response to continued, clockwise rotation of the drive cam, as more fully described below.

A hooking lever 30 having an engaging arm 30a and a release arm 30b is pivotally mounted on a pin 31 which is fixed to the camera housing. A spring 32 is compressed between a stationary pin 33 and a pin 34 fixed to the hooking lever 30 and functions to bias the hooking lever 30 in a counterclockwise direction about the pin 31. As seen in FIG. 1, the hooking lever engaging arm 30a is biased into locking engagement with the engaging portion 23a of the drive cam 23 to effectively prevent clockwise rotation of the drive cam and hence, opening of the shutter.

A holding lever 40 having a holding arm 40a made of iron and a release arm 40b is pivotally mounted about a pin 41. An electromagnet 42 is positioned adjacent the iron holding arm 40a and functions to hold the lever 40 in the position shown in FIG. 1 in response to energization of a coil 43. A return spring 44 is compressed between a fixed pin 45 and a pin 46 mounted on the holding lever 40 and functions to return the holding lever 40 to the position shown in FIG. 1 after the shutter operation is completed.

Figure 4:
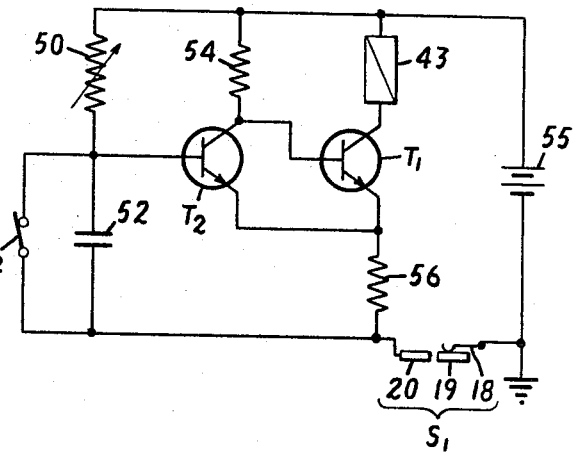
FIG. 4 is a schematic representation of an electrical delay circuit.

FIG. 4 shows an electrical delay circuit for controlling the exposure time, as well known in the art. The delay circuit comprises a pair of transistors $T_1$ and $T_2$ connected as shown so that the collector of one transistor is connected to the base of the other transistor. A variable resistor 50 for controlling the exposure time is connected in series with a capacitor 52 and an electrical power source actuating switch $S_1$ which comprises contact arm 18 and the stationary contacts 19 and 20. A resistor 54 is connected between the positive side of a source of potential 55 and the transistors $T_1$ and $T_2$ and a resistor 56 is connected between the emitters of both transistors and the negative side of the potential source 55. A timing switch $S_2$ is connected in parallel with the capacitor 52 and is automatically actuated, in a well known manner, by a suitable linkage on the shutter mechanism.

Figure 3:
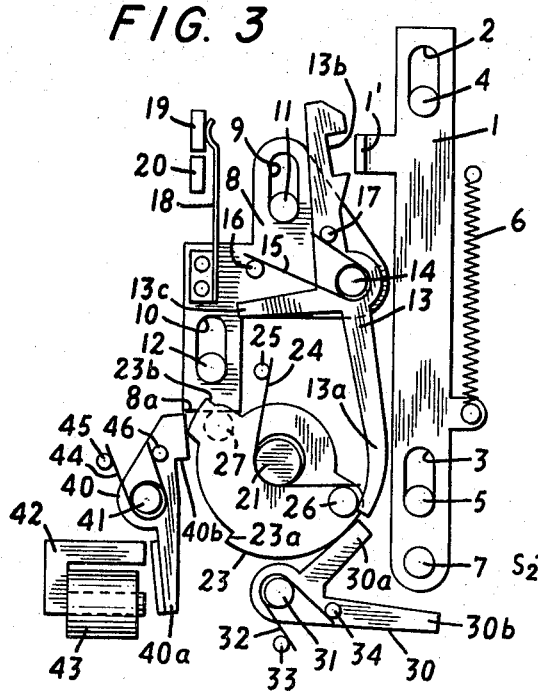
FIG. 3 is a diagrammatic illustration similar to FIGS. 1 and 2 but showing the position of the components when the shutter operation is completed.

The operation of the switching mechanism of the present invention will now be described with reference to FIGS. 1-3. As aforementioned, FIG. 1 shows the position of the various components when the device is in a ready condition with the shutter charged. In such a condition, the trigger lever projection 1' is lockingly engaged with the locking lever arm 13b and the hooking lever engaging arm 30a is lockingly engaged with the engaging portion 23a of the drive cam 23. As the trigger lever 1 is manually displaced downwardly, an external force is applied to the switch plate 8 is also moved downwardly due to the locked position of the release lever 13 thereby causing the switch plate to also move downwardly. As the switch plate 8 is moved downwardly, the contact arm 18 rides over stationary contact 19 onto the stationary contact 20 thereby energizing the coil 43 to magnetize the electromagnet 42. Additional depression of the trigger lever 1 causes the pivot pin 7 to engage with the release arm 30b to pivot the hooking lever 30 in a clockwise direction. As the hooking lever 30 is pivoted in a clockwise direction, the engaging arm 30a is moved out of engagement with the locking portion 23a of the drive cam 23 thereby allowing the drive cam 23 to open the shutter the desired amount. This condition of the device is depicted in FIG. 2.

As seen in FIG. 2, the drive cam return lobe 23b abuts against the holding lever release arm 40b. The holding lever 40 functions to maintain the driving cam 23 in its shutter-open position for the desired time period as determined by the delay circuit. The holding lever 40 is magnetically held in the position shown in FIG. 2 by means of the electromagnet 42 which is energized by the coil 42 during the energization of the delay circuit. In other words, during the period in which the delay circuit is operating, the electromagnet 42 is effective to maintain the holding lever 40 in position to hold the driving cam 23 in its shutter-open position. Also, as the drive cam 23 rotates in a clockwise direction, the pin 26 presses against the actuating lever arm 13a and pivots the release lever 13 in a counterclockwise direction to disengage the locking lever arm 13b from the trigger arm projection 1'. As seen in FIG. 2, the trigger lever 1 is effectively disconnected from the remaining components and may be returned to its initial position without affecting the shutter control. This is an important feature of the present invention and it should be emphasized that the electric delay circuit is connected by means of the trigger lever to the electric power source prior to the opening of the shutter and once the shutter is opened, the trigger lever is rendered ineffective. Thus, if the trigger lever 1 is released before the shutter is closed, the delay circuit remains connected to the power source despite the return movement of the trigger lever to its original position.

After the time period determined by the delay circuit has expired, the coil 43 is deenergized thereby terminating the magnetic attraction between the electromagnet 42 and the iron holding arm 40a. This permits the driving cam 23 to continue its clockwise rotation and the return lobe 23b pivots the holding lever 40 in a counterclockwise direction against the force of the return spring 44. As the drive cam 23 continues to rotate, the return pin 27 comes in contact with the bottom edge 8a of the switch plate 8 thereby applying an external force to the switch plate returning the switch plate 8 to its original position. The drive cam 23 is then returned to its initial position thereby cocking the shutter for subsequent use.

The present invention is also applicable for use with focal plane shutters which comprise a preceding screen and a succeeding screen. All that is required is that the movement of the driving means for moving the preceding screen be coordinated with the release lever 13 and by returning the switch plate 8 to its initial position coordinately with the movement of the succeeding screen driving means.

Hence it can be seen that the present invention obviates the necessity of temporarily locking the trigger lever in its shutter actuating position and therefore extremely accurate manufacturing tolerances are not required. Also, the shutter mechanism need not be designed to withstand the shock of the trigger lever during restoration to its initial position since it is operatively disconnected from the shutter mechanism once the shutter is opened. It is also possible to construct the switching device of the present invention in such a way that the electric power source switch $S_1$ cannot be closed until the shutter has been cocked or charged thereby preventing any unnecessary consumption of electric power.

What I claim and desire to secure by Letters Patent is:

1. In a camera: a shutter actuating mechanism movable through an operating cycle defined by the opening and closing of a shutter; a normally open electric delay circuit for controlling the shutter exposure time; switch means for effecting opening and closing of said electric delay circuit and being unbiased to effect either opening or closing of said electric delay circuit; means mounting said switch means for movement between one position wherein said electric circuit is maintained open and another position wherein said electric delay circuit is closed in response to externally applied forces; a movably mounted trigger lever releasably connected to said switch means movable to a first position to apply an external force to said switch means to effect movement of said switch means from said one position to said another position and sequentially movable to a second position to actuate said shutter actuating mechanism to initiate said operating cycle; disconnecting means operable prior to the complete opening of the shutter for disconnecting said trigger lever from said switch means thereby rendering said trigger lever ineffective to open circuit said electric delay circuit; and wherein said shutter actuating mechanism includes means for applying another external force to said switch means in response to movement of said shutter actuating mechanism at the end of said operating cycle to effect return movement of said switch means from said another position to said one position.

2. In a camera as set forth in claim 1; wherein said disconnecting means includes a pivotally mounted release lever releasably engaged with said trigger lever and movable therewith during movement of said trigger lever to said first position; and means for disengaging said release lever from said trigger lever in response to movement of said shutter actuating mechanism.

3. In a cameras as set forth in claim 2; wherein said switch means includes a movably mounted switch plate having a contact arm fixed thereto; a pair of spaced-apart fixed contacts one of which is electrically connected in said delay circuit and the other of which is normally in contact with said contact arm; and wherein said release lever is pivotally mounted on said switch plate; whereby movement of said trigger lever to said first position effects a corresponding movement of said switch plate due to the engagement of said release lever with said trigger lever and accordingly said contact arm is brought into contact with said one contact in said electric delay circuit thereby closing said normally open electric delay circuit.

4. In a camera as set forth in claim 3; wherein said shutter actuating mechanism includes means for returning said switch plate to its initial position in response to completion of said operating cycle; thereby bringing said contact arm back into contact with said other contact to again open said electric delay circuit.

5. In a camera having a shutter: a shutter actuating mechanism movable through an operating cycle defined by the opening and closing of the shutter; a normally open electric delay circuit for controlling the shutter exposure time; switch means including a stationary contact and a movable contact, movable switch plate having mounted thereon said movable contact, a movable switch plate having mounted thereon said movable contact, means mounting said switch plate for movement between first and second working positions, and wherein said stationary contact is disposed along the path of movement of said switch plate to make contact with said movable contact whenever said switch plate is in said second working position; a movably mounted trigger lever movable to one position to effect movement of said switch plate to said second working position and sequentially movable to another position to actuate said shutter actuating mechanism to initiate said operating cycle; means operable prior to the complete opening of the shutter for rendering said trigger lever ineffective to open circuit said electric delay circuit including connecting means releasably connecting said trigger lever to said switch plate only during movement of said trigger lever to said one position to effect movement of said switch plate to said second working position; and wherein said shutter actuating mechanism includes means thereon engageable with said switch plate to effect movement thereof to said first working position in response to movement of said shutter actuating mechanism at the end of said operating cycle.

* * * * *